United States Patent [19]
Jacobson

[11] Patent Number: 5,218,780
[45] Date of Patent: Jun. 15, 1993

[54] DEAD BAIT TACKLE

[75] Inventor: John D. Jacobson, Southington, Conn.

[73] Assignee: Optimum Innovations, Inc., Southington, Conn.

[21] Appl. No.: 786,385

[22] Filed: Nov. 1, 1991

[51] Int. Cl.⁵ ............................................. A01K 83/06
[52] U.S. Cl. ...................................... 43/44.4; 43/44.8
[58] Field of Search ....................... 43/44.4, 44.2, 44.8, 43/44.9, 44.91

[56] References Cited

U.S. PATENT DOCUMENTS

| | | | |
|---|---|---|---|
| 797,161 | 8/1905 | West | 43/44.4 |
| 2,700,241 | 1/1955 | Blair et al. | 43/44.2 |
| 2,763,086 | 9/1956 | Johnson | 43/44.2 |
| 2,860,443 | 11/1958 | Robinson | 43/44.4 |
| 3,293,791 | 12/1966 | Hinkson | 43/44.4 |
| 3,396,485 | 8/1968 | Kuntz | 43/44.8 |
| 3,399,483 | 9/1968 | Naffziger | 43/44.4 |
| 3,521,395 | 7/1970 | Klemkowski, Jr. | 43/44.4 |
| 3,736,691 | 6/1973 | Gist | 43/44.8 |

Primary Examiner—Richard K. Seidel
Assistant Examiner—Chuck Y. Mah
Attorney, Agent, or Firm—Chilton, Alix & Van Kirk

[57] ABSTRACT

The inventive method for rigging dead bait comprises the steps of selecting a wire leader having first and second ends, passing the second end of the leader through the eye of a fishing hook and forming a loop through said eye. With the second end of the wire, a pin projecting radially from the leader adjacent the loop is formed. The angler slides a coiled wire retainer coaxially along the leader wire such that a larger diameter, open-ended base of the coil faces the pin. The angler forms another loop at the first end of the wire, thereby trapping the coil between the other loop and the pin. After the hook is inserted through the gill of the bait, the retainer is twisted onto the snout so that the free end engages the pin and locks the pin while the retainer confines the snout like a muzzle.

10 Claims, 2 Drawing Sheets

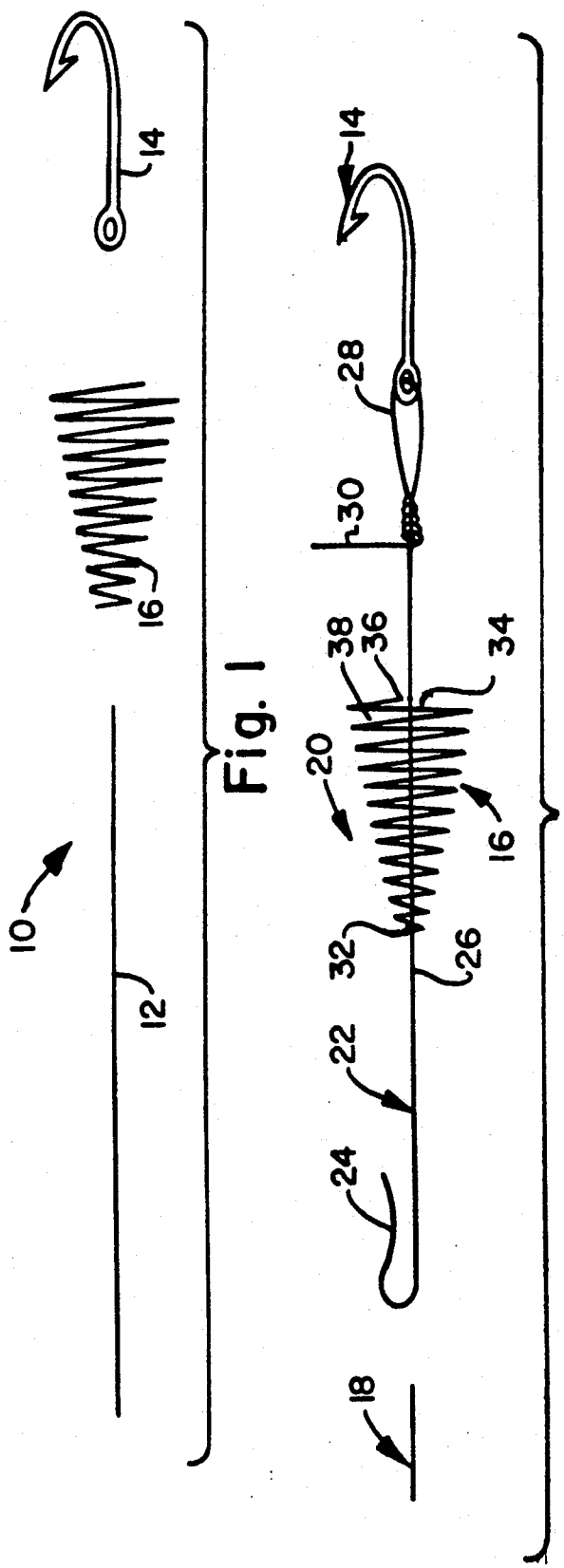
U.S. Patent     June 15, 1993     Sheet 1 of 2     5,218,780

5,218,780

DEAD BAIT TACKLE

BACKGROUND OF THE INVENTION

The present invention relates to fishing tackle, and more particularly, to so-called dead bait tackle of the type used for catching big game fish by trolling.

The rigging of bait on tackle for catching game fish has been notoriously time-consuming and frustrating for the angler. Conventionally, up to ten minutes has been required to properly prepare the bait. This preparation includes the relatively simple steps of forming a wire with a loop at one end for attachment to the line, and a loop at the other end for attachment to a hook.

In the convention technique for rigging ballyhoo bait, the wire forming the second loop is also bent to project radially outward, in the nature of a pin. Once the line and hook are attached to the wire, the angler passes the hook through the gill opening and out through the stomach or back of the bait. The pin is then pushed up through the bottom of the mouth of the bait until it is exposed above the head. A second wire is then wrapped around the head of the bait and secured against the exposed pin.

The wrapping of the second wire is the source of the impatience and frustration experienced by the angler, especially after having rigged dozens of bait during the course of the day. It is necessary, however, for effective performance of the bait while trolling, that the pulling force of the line be transmitted by the pin to the head of the fish (not by the hook), and that the head area of the bait be wrapped tightly so that water does not enter the mouth while trolling, which would first impart erratic gyrations to the bait and eventually rip the bait apart. The bait is often destroyed, however, such that remains are still secured to the tackle. The removal of the remains requires uncoiling of the wrapped wire before the tackle can be rigged with new bait.

Despite the nuisance of rigging dead bait tackle in this conventional manner, no one, prior to the present inventor, has proposed a more efficient technique. This is due in large part to the necessity to accommodate a wide variety of sizes and shapes of the bait. For example, ballyhoo have a narrow snout, whereas mullet have a broad, wedge-shaped snout. Mackerel are very large in size. Even strip bait, such as from bonita, are used, especially by commercial fishermen. Wrapping a wire around the snout has simply been the most convenient way to rig ballyhoo. The other baits have required more involved rigging techniques, such as sewing for mullet and mackerel.

SUMMARY OF THE INVENTION

It is an object of the invention to provide a dead bait fishing tackle that can be formed and properly baited in a simpler and quicker way relative to conventional techniques.

It is a further object to provide dead bait tackle components for sale by tackle shops, which are especially suited for use in a simple and efficient rigging of dead bait tackle.

It is also an object of the invention to provide a simpler and more efficient method of rigging dead and other types of bait such as strip baits and squid.

These and other objects and advantages to be described below are accomplished in accordance with the present invention, by providing in place of the second, wrapping wire, a preformed retainer member for securing bait to fishing tackle, in the form of a generally frustroconical member, preferably a precoiled wire spring, having a small diameter apex, a large diameter base, and including means for engaging the projecting pin. The wire has a free end at the base, spaced from the adjacent coil, whereby the coil can simultaneously wrap around the snout of the bait while being locked with the pin.

The inventive method for rigging dead bait comprises the steps of selecting a wire leader having first and second ends, passing the second end of the leader through the eye of a fishing hook and forming a loop through said eye. With the second end of the wire, a pin projecting radially from the leader adjacent the loop is formed. The angler slides a coiled wire retainer coaxially along the leader wire such that a larger diameter, open-ended base of the coil faces the pin. The angler forms another loop at the first end of the wire, thereby trapping the coil between the other loop and the pin. After the hook is inserted through the gill of the bait, the retainer is twisted onto the snout so that the free end engages the pin and locks the pin while the retainer confines the snout like a muzzle.

In one embodiment the apex of the spring, opposite the base, can be lead-filled with, for example, an egg sinker, so that the extra weight causes the bait to become submerged while being pulled through the water.

BRIEF DESCRIPTION OF THE DRAWINGS

The preferred embodiment of the invention will be described below with reference to the accompanying drawings, in which:

FIG. 1 is plan view of the distinct components that are assembled into a dead bait tackle in accordance with the invention;

FIG. 2 is a view of an assembled tackle ready for rigging with bait;

FIG. 3 is a view similar to FIG. 2, with the bait rigged,

DESCRIPTION OF THE PREFERRED EMBODIMENT

Figure 4:
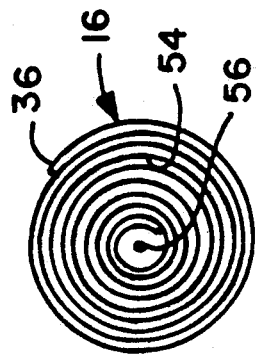
FIG. 4 is an enlarged, end view of a coil spring retainer according to the present invention.

FIG. 1 shows the components 10 of the dead bait tackle in accordance with the invention, as would, for example, be sold together in a tackle shop or the like. A leader wire 12 and hook 14 are conventional, whereas the retainer member 16 is new, and replaces a second, substantially straight wrapping wire (not shown) conventionally used in the combination. The components 12, 14, and 16 are typically purchased and assembled into an intermediate configuration 20 shown in FIG. 2. On the fishing boat as needed during the outing, the final configuration 40 with bait 42 is attached to fishing line 18, as shown in FIG. 3.

The configuration 20 shown in FIG. 2 is assembled by passing the leader wire 12 through the eye of hook 14 and forming loop 28, with sufficient wire remaining to wind back away from the hook and leave a projection or pin 30 extending substantially perpendicularly to the shank portion 26, in a conventional manner. In a novel feature of the invention, a preformed, unitary, substantially frustroconical retainer member 16 is carried by and passed coaxially away from the leading end 24 of the wire, with the larger diameter base portion 36 facing the pin 30. The leading end can be bent once as shown in FIG. 2 so that the retainer 16 will not slide off. Thus, the configuration of FIG. 2 is a novel combination of an elongated wire member 22 with retainer means 16 slidable thereon. The wire member 22 has a lead end formable into a loop 24 for attachment to the fishing line 18, and a trailing end formed as a loop 28 for attachment to the hook 14. A shank portion 26 extends between the front loop 24 and the radially projecting pin means 30. The retainer member 16 is carried on the shank in front of the pin 30.

The intermediate configuration shown in FIG. 2 can be assembled by the angler well in advance of the fishing outing. On the night before, and during the outing, the bait itself can be secured to the tackle. FIG. 3 shows how this is achieved in accordance with the present invention. First, the hook 14, loop 28, and pin 30 are inserted through the gill of the bait fish 42, so that the point of the projects through the gullet or back and the pin 30 is in the head 44. The pin 30 is then forced upwardly through the bottom of the mouth until it projects from the head 44. The retainer 16 is then slid toward the pin 30 so that the frustroconical shape acts as a funnel to confine the snout of the bait. During this confining step, the retainer 16 is twisted or rotated so that the free end 36 contacts the pin and guides the adjacent coils of the retainer along the pin. This tightens the confinement of the snout as the retainer is drawn further and further along the head 44, and the pin is worked into a position between two inner coils. At least 360 degrees of pin travel along the helix of the coil spring, from the free end 36 at the base 34 of the retainer toward the apex 32 of the spring, is preferred. Preferably, the base of the retainer advances far enough along the head 44 to confine the gills 46, thereby minimizing resistance as the bait is pulled through the water. As a final step to arrive at the configuration shown in FIG. 3, the angler finishes the loop at 24 and attaches the line 18 in a conventional manner, immediately before casting the line into the water.

Figure 5:
FIG. 5 is a cross section view of the preferred form of the wire used for the coil spring retainer of FIG. 4.

FIGS. 4 and 5 show the preferred embodiment of the retainer 16. The preformed retainer is in the form of a wound coil spring that may be tightly wound or have some pitch. The coiled wire may be round, but a prismatic cross section, such as the square cross section shown in FIG. 5, is preferred. The preferred wire defines at least one edge 54, which is oriented toward the axis 56 of the retainer 16, as shown in FIG. 4. This edge helps prevent the retainer 16 from coming loose from the bait, because the twisting of the retainer during assembly causes the edges to "bite" into the head. Also, the force of the water during trolling helps keep the spring on the head.

Figure 6:
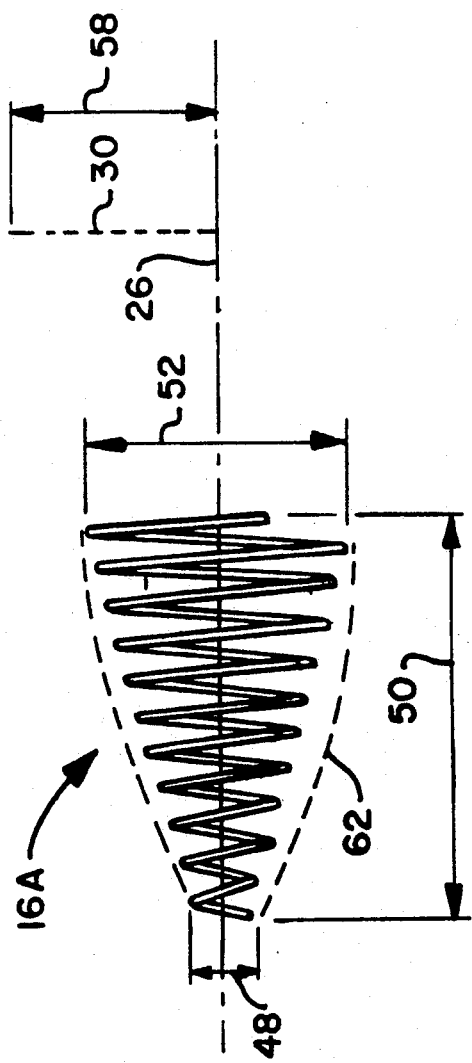
FIG. 6 is an enlarged side view of one general shape of the retainer.

FIG. 6 shows the preferred dimensional relationships associated with the basic retainer 16A. The minimum diameter, length, and maximum diameters are indicated at 48, 50, and 52, respectively. These relationships will vary according to the size and type of bait to be rigged. The following table shows the relationships that are ideal for covering most game fishing needs:

| Preferred Dimensional Relationship For Various Retainers | | | |
| --- | --- | --- | --- |
| Variation # | Length (in.) | Max. Diam. (in.) | Min. Diam. (in.) |
| 1 | 0.85 | 0.45 | 0.15 |
| 2 | 0.85 | 0.45 | 0.30 |
| 3 | 0.85 | 0.55 | 0.40 |
| 4 | 0.85 | 0.55 | 0.25 |
| 5 | 1.00 | 0.95 | 0.25 |
| 6 | 1.00 | 1.20 | 0.25 |
| 7 | 1.75 | 1.75 | 0.25 |

In general, the range of sizes can be characterized by the parameter p, where $$p = \frac{[(\text{max. diam.})/(\text{min. diam.})]}{\text{length}}$$

The parameters in the above table range between about 1.6 and 6.3 and would normally be expected to lie in the range between about 1.5 and 7.5.

FIG. 6 also shows that the sides 62 of the retainer can be somewhat bowed. It should also be appreciated that the thickness of the coiled wire and the material and the pitch of the helix, are matters of design choice, so long as the pin 30 can be advanced along the helix in the manner described above. Although the coil spring retainer is preferred, other preformed unitary, generally funnel, bell-shaped, or frustroconical retainers that are slidable along the shank 26 and lockable to the pin 30, also fall within the broadest scope of the invention.

As also shown in FIG. 6, the pin 30 (in phantom) should project radially from the shank 26 a distance greater than the radius of the maximum diameter 52 of the retainer, and should preferably be in the range of 1.5 to 2.5 times the radius of the maximum diameter 52, so as to extend through the base of the retainer as final assembly begins.

Figure 7:
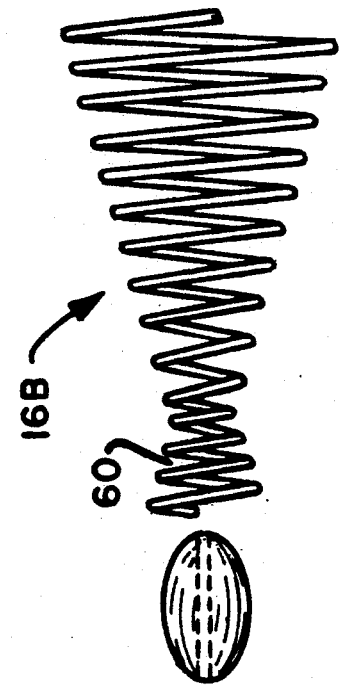
FIG. 7 is an enlarged side view of another general shape of the retainer, adapted for submerged trolling of the bait.

FIG. 7 shows an enhanced retainer 16B, having an inverted "nose cone" 60 at the apex for holding lead or other heavy weight, to cause the bait to become submerged while being pulled through the water. For example, retainer variation number 6 in the foregoing table could be formed with a nose cone 60 having a large, front diameter of 0.60 inch and a length of 0.30 inch. The overall "unbalanced hourglass" shape of the retainer can easily be manufactured using conventional spring coiling machines. An egg sinker (an egg-shaped lead pellet with a through bore) can easily be used for this purpose.

It is now possible to rig other types of baits with this simple rig. A mullet is typically used after it has been deboned-removal of the backbone-and the tail split to approximately half its length. With this new rig, you would pass the point of the hook through the gill and let the hook rest towards the back or stomach. The depth of the hook in the fish is adjusted by the hook shank length and the length created from the eye of the hook and the location of the pin. It is always preferred to have the point of the hook available for the fish. With the mullet, it is possible for it to be practically hidden, helping reduce the frequency of snagging drifting weeds. Other types of baits can be rigged according to the invention. These include strip baits, squid, and baits used for bottom fishing. By keeping the bait on in a more efficient manner, there is less chance of having the bait stripped off by the fish.

I claim:

1. Fishing bait tackle for attachment to a line, comprising:
   an elongated wire member having a lead end and a trailing end, the lead end including first means for attaching the lead end to said line, a shank portion extending from the lead end, second means, projecting substantially radially from the shank portion for penetrating the bait and pulling the bait when the lead end of the wire is pulled, and third means, at the trailing end, for attaching a hook; and
   retainer means slidable on the shank portion between the first means and the second means, and selectively engageable with the bait and the second means together, wherein the retainer means is in the form of a coil spring having a free end engageable with and rotatable around said second means.

2. The tackle of claim 1, wherein the retainer means is in the general form of an hourglass which has a smaller portion and a larger portion, said larger portion having the free end and being engageable with the bait and the second means.

3. The tackle of claim 1 wherein the spring is formed from wire having a prismatic cross section defining at least one edge, and wherein said edge generally faces said shank portion.

4. The tackle of claim 1, wherein the first and third means are in the form of loops.

5. The tackle of claim 4, wherein the wire member is a unitary piece of wire that is looped and wound around itself at the lead and trailing ends to form said first and third means, and wherein said second means is defined by a portion of the wire that has been wound around itself adjacent said second means.

6. A method for rigging bait, comprising:
   selecting a wire leader having first and second ends;
   passing the leader through the eye of a fishing hook and forming a loop through said eye near the second end of the leader;
   with the second end of the wire, forming a pin projecting radially from the leader adjacent the loop;
   sliding a coiled wire retainer coaxially over the leader wire such that an open-ended base portion of the coil faces the pin;
   forming another loop at the first end of the wire, thereby trapping the retainer between said other loop and the pin.

7. The method of claim 6, wherein the step of forming the pin includes providing the pin with a radial length that is greater than the radius of the base portion of the coil.

8. The method of claim 6, further including the steps of,
   placing the hook into the bait, and
   locking the bait, the pin, and the retainer together.

9. The method of claim 8, wherein the step of locking includes piercing the bait with the pin until the pin is exposed through the bait,
   sliding the retainer over the bait,
   engaging the exposed pin with the base portion of the retainer, and
   rotating the retainer to securely lock the pin between two coils while the retainer fits on the bait as a muzzle.

10. A fishing tackle kit of components for fishermen who will assemble the components as bait tackle for attachment to a fishing line, comprising:
    fishing hooks of various sizes;
    wire leaders of various sizes, each bendable at one end to form a first eye for attachment to said line and bendable at the other end to form a second eye for attachment to one of said hooks and a pin for engaging bait; and
    coil springs of various sizes, each spring being sized to pass coaxially over one of said leaders;
    wherein the various sizes of coil springs have lengths, minimum diameters, and maximum diameters that are substantially the same as at least three of the spring variations appearing in the following table:

| Variation # | Length (in.) | Max. Diam (in.) | Min. Diam (in.) |
|---|---|---|---|
| 1 | 0.85 | 0.45 | 0.15 |
| 2 | 0.85 | 0.45 | 0.30 |
| 3 | 0.85 | 0.55 | 0.40 |
| 4 | 0.85 | 0.55 | 0.25 |
| 5 | 1.00 | 0.95 | 0.25 |
| 6 | 1.00 | 1.20 | 0.25 |
| 7 | 1.75 | 1.75 | 0.25 |

* * * * *